United States Patent [19]

Dasgupta

[11] Patent Number: 5,318,669
[45] Date of Patent: Jun. 7, 1994

[54] ENHANCEMENT OF PAPER DRY STRENGTH BY ANIONIC AND CATIONIC POLYMER COMBINATION

[75] Inventor: Sunil P. Dasgupta, Wilmington, Del.

[73] Assignee: Hercules Incorporated, Wilmington, Del.

[21] Appl. No.: 929,554

[22] Filed: Aug. 14, 1992

Related U.S. Application Data

[63] Continuation-in-part of Ser. No. 812,534, Dec. 23, 1991, abandoned.

[51] Int. Cl.$^5$ .................... D21H 17/31; D21H 17/55; D21H 17/72
[52] U.S. Cl. .................... 162/164.3; 162/164.6; 162/178; 162/168.3; 162/183
[58] Field of Search ............... 162/111, 112, 175, 178, 162/183, 168.3, 164.3, 164.6

[56] References Cited

U.S. PATENT DOCUMENTS

| | | | |
|---|---|---|---|
| 3,049,469 | 8/1962 | Davison | 162/164 |
| 3,058,873 | 10/1962 | Keim et al. | 162/164 |
| 3,332,834 | 7/1967 | Reynolds, Jr. | 162/164 |
| 3,819,555 | 6/1974 | Kaufman | 260/29.4 UA |
| 4,002,588 | 1/1977 | Strazdins | 260/29.6 NR |
| 4,557,801 | 12/1985 | Avis | 162/157.6 |
| 4,925,530 | 5/1990 | Sinclair et al. | 162/168.3 |

FOREIGN PATENT DOCUMENTS

| | | | |
|---|---|---|---|
| 0362770 | 4/1990 | European Pat. Off. | D21H 21/18 |
| 0493757 | 7/1992 | European Pat. Off. | C08G 69/48 |
| 782037 | 4/1978 | South Africa . | |

OTHER PUBLICATIONS

Casey, *Pulp and Paper*, 3rd ed. (1981) vol. III; pp. 1501-1506.

*Primary Examiner*—Peter Chin
*Attorney, Agent, or Firm*—Roy V. Jackson

[57] ABSTRACT

A process for making paper to enhance the dry strength of the paper produced without substantially reducing its softness comprising adding to a bleached pulp furnish, separately or together, (1) an anionic polymer selected from the group consisting of carboxymethyl guar, carboxymethyl bean gum, carboxymethyl hydroxyethyl guar, and a carboxymethyl hydroxypropyl guar, with (2) a cationic polymer selected from the group consisting of a cationic guar, a cationic acrylamide copolymer, a cationic bean gum, a cationic amineepichlorohydrin wet strength resin, and both a cationic wet strength resin and at least one of the other said cationic polymers, a composition for adding to a paper-making pulp slurry comprising the said polymers, a method for making the said composition, and a paper product containing the said composition, are disclosed.

24 Claims, No Drawings

ENHANCEMENT OF PAPER DRY STRENGTH BY ANIONIC AND CATIONIC POLYMER COMBINATION

This application is a continuation-in-part of U.S. application Ser. No. 812,534, filed Dec. 23, 1991 now abandoned.

This invention relates to a process for making paper to enhance the dry strength of the paper produced without reducing its softness, that comprises adding to a pulp furnish a combination of cationic and anionic polymers.

BACKGROUND OF THE INVENTION

One of the major problems that tissue and towel manufacturers face is the unacceptable reduction of dry strength in paper products such as tissue and toweling in which a high degree of softness as well as dry strength is essential, resulting from the use of an increasing percentage of recycled or secondary pulp, chemithermomechanical pulp (CTMP) (CTMP) and groundwood, and the consequent reduction in average fiber length. Softness is a very important property in paper used for making high quality tissues and toweling, and procedure modifications or additives that achieve a compensating increase in paper strength normally decrease paper softness or increase stiffness. There is therefore a need for an effective additive that will enhance paper strength without adversely affecting the softness of the paper.

The tissue and towel manufacturers get the softness of their products evaluated by the perception of a human panel. Because it is very subjective test, correlation of any single laboratory test evaluation with the perception test results may sometimes be difficult. However, extensive research efforts by workers in this area have shown that the results of a bending stiffness test by itself or in combination with tensile stiffness data correlate very resonably with human perception evaluation.

European published Patent No. 0 362 770 A2 (Application No. 89118245.3) discloses a mixture of cationic and anionic polymers as a strengthening additive for papermaking processes, essentially for unbleached pulps containing black liquor. The mixture comprises a water-soluble, linear, cationic polymer having a reduced specific viscosity greater than 2 dl/g and a charge density of 0.2 to 4 meq/g, and a water-soluble, anionic polymer having a charge density of less than 5 meq/g that is reactable in the presence of water with cationic polymer to form a polyelectrolyte complex. Combinations of cationic guar (for example, guar "derivatized" with glycidyltrimethylammonium chloride) and cationic acrylamide copolymers, with anionic polymers in addition to those already contained in the black liquor (including sodium carboxymethyl guar) are disclosed. The preferred anionic polymer content is constituted by those polymers naturally present in unbleached pulps made by either chemical or mechanical pulping.

U.S. Pat. No. 3,058,873 discloses a combination of polyamide-epichlorohydrin resins with cellulose ethers or cationic starches for improving paper wet strength, specifically the use of CMC CT, a crude technical grade of carboxymethyl cellulose (CMC), and a polyamide-epichlorohydrin resin to improve wet strength in paper.

Published Japanese patent application JP 53106803 A, for which no counterpart exists, discloses paper production having improved wet strength and transparency by forming sheet from cellulosic material, carboxyalkyl cellulose and polyamide-epichlorohydrin resin, drying and treating with acid. Specifically, the method comprises (1) preparing a sheet from a mixture of (a) cellulosic material and (b) partially substituted carboxy-(lower alkyl)-cellulose of which the degrees of substitution (D.S.) is 0.10–0.50, followed by coating the resulting sheet with (c) polyamide-epichlorohydrin resin (or preparing a sheet from a mixture of (a)+(b)+(c), (2) drying the sheet, and (3) treating the dried sheet with a diluted acid solution. The partially lower-alkyl-carboxylated cellulose (typically CMC of D.S. 0.10–0.50) is firmly fixed on the cellulosic pulp when the polyamide-epichlorohydrin resin is present.

It would be desirable to provide a process for making paper from a bleached pulp furnish that uses a combination of cationic and anionic polymers to enhance the dry strength of the paper more efficiently than the known processes.

SUMMARY OF THE INVENTION

According to the invention, a process for making paper to enhance the dry strength of the paper produced without reducing its softness comprises adding to a bleached pulp furnish, separately or together, (1) an anionic polymer selected from the group consisting of carboxymethyl guar, carboxymethyl bean gum, carboxymethyl hydroxyethyl guar (such as the carboxymethyl guar available under the name Galaxy 707D from Aqualon and the name Jaguar 8707 from Hi-Tek), and a carboxymethyl hydroxypropyl guar (such as the carboxymethyl guar available under the name Jaguar 8600 from Hi-Tek), and (2) a cationic polymer selected from the group consisting of a cationic guar, a cationic acrylamide copolymer, a cationic bean gum, and a cationic wet strength resin that is a polymeric amine epichlorohydrin resin, such as polyamide-epichlorohydrin (PAE) resin, a polyalkylenepolyamine-epichlorohydrin (PAPAE) resin, or an amine polymer-epichlorohydrin (APE) resin, preferably the reaction product of a dibasic acid, more preferable adipic acid, with a polyalkylenepolyamine, more preferably a polyethylenepolyamine, in which amine polymer-epichlorohydrin resin amine groups have been alkylated and crosslinked with epichlorohydrin to produce a polyamide-epichlorohydrin resin that has azetidinium or epoxide functionality, the anionic component and the cationic component are added together or separately to the pulp stock in the wet end of the paper machine, in a total amount of 0.1 to 5 percent based on the dry weight of the pulp, and the ratio of the anionic component to the cationic component is from 1/20 to 10/1.

A polyamide-epichlorohydrin resin may more specifically be described as a poly(aminoamide)-epichlorohydrin resin, and is sometimes called a polyamide-polyamine-epichlorohydrin resin. If the cationic additive is a wet strength resin the benefits of the invention are achieved and the wet strength of the paper is additionally increased.

In a bleached pulp furnish, the combination of additives according to the invention is significantly more effective as a dry-strength additive than the same amounts of each of the cationic guar or the anionic guar, while maintaining substantially the same degree of softness (as measured by bending stiffness) as found in paper lacking a conventional dry-strength additive. A combination of an anionic guar and a cationic acrylamide copolymer is similarly more effective than the acrylamide copolymer alone as a dry strength additive at the same level of addition. These advantages are only achieved if bleached pulp is used in the process according to the invention.

Preferably, the wet strength resin is added to the anionic/cationic guar combination according to the invention. A combination of an anionic guar, a cationic guar (or acrylamide copolymer) and the wet strength resin is more effective than a combination of a cationic guar (or acrylamide copolymer) and the wet strength resin, all the other conditions being the same. It is at least as effective as a combination of an anionic guar and the wet strength resin.

When clear solutions of the individual components of the mixtures according to the invention are added together, aggregates of fine colloidal particles (which are usually called coacervates), apparently bound together by some physical or chemical force, are formed. This combination provides dry strength enhancement for paper that is higher than the strength enhancement provided by the same amount of either the cationic guar or the anionic guar, demonstrating a synergistic effect from the aggregates of fine colloidal particles that is substantially identical to the results obtained by adding the same anionic and cationic compounds individually to the pulp system. The cationic additive may also be a wet strength resin, when added with the anionic compound either individually to the pulp system or as coacervates. In either case, the presence of the anionic compound very significantly enhances the efficiency of a wet strength resin, and the use of the coacervates has the advantages of convenience.

The invention also comprises a composition for modifying a paper pulp slurry to enhance the dry strength of the paper produced without substantially reducing its softness comprising (1) an anionic polymeric component selected from the group of polymers consisting of carboxymethyl guar, carboxymethyl bean gum, carboxymethyl hydroxyethyl guar, and a carboxymethyl hydroxypropyl guar, and (2) a cationic polymeric component selected from the group of polymers consisting of a cationic guar, a cationic acrylamide copolymer, a cationic bean gum, a cationic wet strength resin, and both a cationic wet strength resin and at least one of the other of said cationic polymers, the wet strength resin being a polymeric amine-epichlorohydrin resin selected from the group consisting of a polyamide-epichlorohydrin (PAE) resin, a polyalkylenepolyamine-epichlorohydrin (PAPAE) resin, and an amine polymer-epichlorohydrin (APE) resin, in which amine groups have been alkylated with epichlorohydrin to produce a polyamine-epichlorohydrin resin that has azetidinium or epoxide functionality.

Preferably in the said composition, the anionic polymeric component is a carboxymethyl guar and the cationic polymeric component is a cationic guar and a cationic wet strength resin that is produced by reacting a saturated aliphatic dicarboxylic acid containing three to ten carbon atoms with a polyalkylenepolyamine, containing from two to four ethylene groups, two primary amine groups, and one to three secondary amine groups (such as diethylenetriamine, triethylenetetramine and tetraethylenepentamine), to form a poly(aminoamide) having secondary amine groups that are alkylated with epichlorohydrin to form a PAE resin. Most preferably, the wet strength resin is Kymene 557H (available from Hercules Incorporated), in which adipic acid is reacted with diethylenetriamine to form a poly(aminoamide) that is alkylated and crosslinked with epichlorohydrin to form a PAE resin. The invention also comprises a paper product containing the said composition according to the invention, and a process for making the composition comprising adding adding a mixture of the anionic guar and the cationic guar, preferably as an aqueous suspension, to a paper pulp slurry and then adding the wet strength resin later to form the composition in the slurry.

Under the normal wet end conditions of papermaking, the combination of additives according to the invention enhances paper strength through ionic bonds. That enhancement is an important feature for toweling, toilet tissue, or any other fine paper in which softness and dry strength or a combination of dry and wet strength, without compromising softness, are valued properties.

A cationic guar molecule with no anionic guar will have all its ionic groups available bond with the cellulose-fiber ionic groups of opposite charge. Thus, a cationic guar by itself is expected to offer a higher number of ionic bonds. When an anionic and a cationic guar are mixed together either in the presence of pulp or by themselves, an interaction takes place between them and this results in a lower number of ionic sites in the combination to bond with cellulose fibers. (A similar effect occurs when a wet strength resin, such as Kymene 557H, is in the additive system). Hence, the higher effectiveness of a combination as a dry strength is unexpected, particularly since it is not present if used with unbleached pulp containing black liquor.

According to the results obtained with various guar additives, this synergistic effect of an anionic and a cationic guar additive is independent of the chain-length of the compound as well as molecular weight as measured by solution viscosity. It is also independent of the charge density of the additives. However, the degree of effectiveness of the combinations depends on the molecular weight. There is evidence that the relatively higher molecular weight guars produce relatively higher paper strength.

DETAILED DESCRIPTION OF THE INVENTION

Guar is a natural copolymer consisting of galactose and mannose, usually in the ratio of 1 to 2, in a linear chain of $\beta$-d-mamopyransyl with $\lambda$-D-galactopyranosyl units as side branches. An anionic guar is obtained by reacting a natural guar with caustic and subsequently with monochloroacetate. The resultant product is a carboxymethyl guar (CMG). Similarly, carboxymethyl-hydroxypropyl guar (CMHPG) is prepared by reacting natural guar with caustic and subsequently with monochloroacetate and propylene oxide. Examples of CMG are Galaxy 707D, (Aqualon), Jaguar 8707 (Hi-Tek) and those of CMHPG are WG-18 (Aqualon), Jaguar 8600 (Hi-Tek). Carboxymethyl hydroxyethyl guars are other examples of anionic guar additives.

A cationic guar is obtainable by reacting natural guar with caustic and subsequently with quaternary ammonium chloride, and is available from Dow as Dow Quart 188; such a cationic guar is available under the name Gendrive 162.

The structure of natural guar gum is as follows:

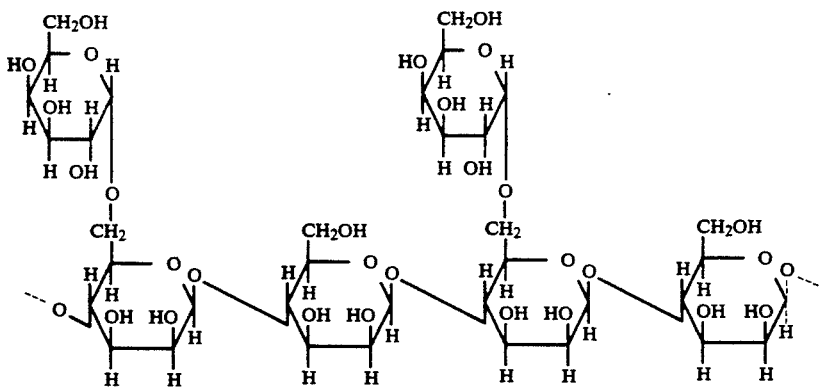

Polyacrylamide is prepared by polymerization of acrylamide with N,N'-methylene bisacrylamide. A cationic polyacrylamide is usually prepared by making reacting polyacrylamide with acryloxytrimethyl ammonium chloride (ATMAC), methylacryloxytrimethyl ammonium chloride (MTMAC) or diallyldimethyl ammonium chloride (DADMAC). The anionic acrylamide compounds are usually copolymers of acrylamides and sodium acrylates.

The preferred wet strength resins are produced by reacting a saturated aliphatic dicarboxylic acid containing three to ten carbon atoms, preferable adipic acid, with a polyalkylenepolyamine, containing from two to four ethylene groups, two primary amine groups, and one to three secondary amine groups, such as diethylenetriamine, triethylenetetramine and tetraethylenepentamine, to form a poly(aminoamide) having secondary amine groups that are alkylated with epichlorohydrin to form tertiary aminochlorohydrin groups. These groups self-alkylate to form hydroxyazetidinium groups which are considered responsible for wet strength in paper. They are cationic in character. If tertiary amines are present in the aminopolyamide or polyamine backbones, quaternary epoxide groups are produced. The actual procedure for synthesizing these wet strength resins differ from product to product, but the objective to generate aminopolyamideepichlorohydrin functionality remains the same.

Kymene ® wet strength resins are most preferred. Some examples of wet strength resins available from Hercules Incorporated are Kymene 557H, Kymene 450, and Kymene 2064 (an APE resin based on methyldiallylamine monomer that is polymerized to an amine polymer precursor), as well as low absorbable organic halide (AOX) versions such as Kymene 557LX. Most preferred is Kymene 557H, in which adipic acid is reacted with diethylenetriamine (DETA) to form a poly(aminoamide) that is alkylated and crosslinked with epichlorohydrin to form a PAE resin, namely, adipic acid-DETA poly(aminoamide) epichlorohydrin.

The specific amount and the type of the additives will depend on, among other things, the type of pulp characteristics. The ratios of the anionic and the cationic additives may range from 1/20 to 10/1, preferably from 2/1 to 1, and most preferably about 1/1. The preferable level of addition of the combination is 0.1 to 2% based on the dry weight of pulp.

Since the additive combinations of the invention consist of two or more components, they can be added to the furnish in different ways that may affect the rate of production in the plant and the properties of the final product. The usual procedure is to add these additives individually in the wet end system in a predetermined sequence to achieve what experiment shows to be the most desirable product. Preferably, however, these additives are introduced into the wet end system by combining the anionic and cationic additives beforehand and adding the resulting coacervates.

In the following examples, handsheets were prepared from pulp which was refined in a Valley beater to 500±5 cc Canadian Standard Freeness. The 22.50% consistency pulp slurry was diluted to 2.66% solids with normal tap water in a proportioner where the combination of additives according to the invention were added to the pulp while stirring. An aliquot of this pulp slurry was further diluted to about 0.023% consistency in a Deckle box for molding handsheets. Both refining and papermaking were made at pH 7.5 to 8.0. Thus, the papermaking process consists of three main steps. They are (a) formation of an aqueous slurry of cellulose fibers, (b) addition of dry strength additives and (c) formation of sheet and drying to a desired moisture content (preferably 3 to 6 percent).

The step (b) may be carried out by adding the anionic component to the pulp first, followed by the cationic component, and the wet strength resin if used. Blends of anionic and cationic components may also be added to the pulp directly in the papermaking system. Whether individually or blended together, the additives are mixed into the wet end of the paper machine, preferably under shear.

Tensile strength, modulus, and elongation were measured in an Instron, according to a standard procedure, Tappi 494, as a guide. Drying was to a moisture content of 3 to 6 percent. By the same testing procedure, the tensile energy per unit volume that the fibers have assimilated up to the point of rupture was also determined. This is referred to as tensile energy absorption (TEA). The results of bending stiffness presented here have been measured in a Handle O'Meter (Thwing-Albert Instrument Co.).

The same testing procedure measures the combined effect of sheet stiffness, surface friction, and thickness that affect the subjective perception of softness of paper products. (Holger Hollmark, *TAPPI Journal*, p 97, February 1983; *Handbook of Physical and Mechanical Testing of Paper and Paperboard*, Ed. Richard E. Mark, Ch. 11, p 511, 1983).

EXAMPLE 1

This Example is a laboratory evaluation of strength properties and bending stiffness on handsheets prepared with 70/30 Northern Softwood/CTMP furnish. The results are shown in Table 1. The anionic additives were first added to the pulp followed by the cationic additive.

The control used in this case is a handsheet prepared with the same pulp with no additive. Galaxy 707D is a carboxymethyl guar (DS 0.08), and Gendrive 162 is a quaternary ammonium chloride treated guar (DS 0.075). Jaguar 8600, available commercially as Hi-Tek, and WG-18, are hydroxypropylcarboxymethyl guars. Guar AQU-3129 and High DS cationic guar (404-48-3) are available from Aqualon, a Hercules Incorporated unit. WC-100 and Hercofloc 1129 sodium acrylate-acrylamidecopolymer and sodium polyacrylate homopolymer, respectively. Reten ® 200 is a polyamide-epichlorohydrin polymeric material used as a retention. The "Jaguar" products are available from High-Tek Co.

TABLE 1

| Anionic Additive | Percent | Cationic Additive | Percent | Enhancement, % Control | | | Bending Stiffness % of Control |
|---|---|---|---|---|---|---|---|
| | | | | Tensile Strength | TEA | Elongation | |
| None | — | Gendrive 162 | 1.0 | 6.5 | — | — | — |
| Galaxy 707D | 0.5 | Reten ® 200 | 0.4 | 8.3 | — | — | — |
| Galaxy 707D guar | 0.5 | Gendrive 162 | 0.5 | 33.9 | — | — | 94 |
| None | — | Jaguar CP-13 | 1.00 | 6.6 | 13.9 | 10.0 | — |
| Jaguar 8600 | 0.5 | Jaguar CP-13 | 0.50 | 16.0 | 23.9 | 13.0 | 106 |
| None | — | High MW Cationic Guar (0083-40-3) | 1.00 | 4.0 | 12.7 | 3.1 | 104 |
| K0341A 2 (WG-18) | 0.5 | 0083-40-3 | 0.5 | 12.0 | 23.1 | 13.0 | 105 |
| None | — | Percol 743 | 1.00 | 2.5 | 3.5 | 2.8 | 101 |
| WC-100 | 0.5 | Percol 743 | 0.50 | 14.0 | 6.9 | 22.0 | 113 |
| Hercofloc 1129 | 0.5 | Reten 157 | 0.50 | 15.4 | 3.2 | 8.9 | 101 |
| None | — | 404-48-3 | 1.0 | 3.7 | | | |
| AQU-D3129 | 0.5 | 404-48-3 | 0.5 | 14.3 | | | |
| Jaguar 8707 | 0.5 | Jaguar CP-13 | 0.5 | 21.3 | 48.0 | 19.4 | |

EXAMPLE 2

Results on laboratory evaluation of strength properties, tensile stiffness and bending stiffness on handsheets prepared as in Example 1 are presented in Table 2. Pulp system employed in Set No. 1 is 50/50 recycled/northern softwood bleached kraft pulp. In Set No. 2, the pulp is 100 percent bleached kraft. The process to prepare the guars is similar to what has been explained in Example 1, except that the anionic guar was a carboxymethyl guar (available from Aqualon under the designation AQU-D3129) having a DS of 0.15 and the cationic guar (available from Aqualon under the designation 404-48-3) was a quaternary-modified guar having a DS of 0.10.

TABLE 2

| None | Anionic Guar | % | Cationic Guar | % | Enhancement, % of Control | | | Tensile Stiffness % of control | Bending Stiffness % of Control |
|---|---|---|---|---|---|---|---|---|---|
| | | | | | Tensile Strength | TEA | Elongation | | |
| 1 | AQU-D3129 | 0.5 | 404-48-3 | 0.5 | 21.5 | 37.77 | 13.3 | 108 | 95 |
| 2 | AQU-D3129 | 0.5 | 404-48-3 | 0.5 | 15.2 | 31.22 | 16.1 | 99 | 99 |

EXAMPLE 3

Laboratory evaluation results of strength properties and bending stiffness on handsheets prepared with 70 30 northern softwood/CTMP (Nos. 1 and 2) and recycled pulps (Nos. 3 to 5) are shown in Table 3. The anionic additive is added to the pulp prior to adding the cationic additive. The guar additives Galaxy 707D and Gendrive 162 are the same as those used in Example 1. Kymene ® 557H is the reaction product of an polyamide and epichlorohydrin conventionally used as a wet strength resin in paper and available from Hercules Incorporated. KN9-56CMG is a carboxymethyl guar. The combinations show minimal adverse effects on paper softness caused by the presence of the wet strength agent, as indicated by the stiffness data.

TABLE 3

| No | Anionic Additive | Percent | Cationic Additive | Percent | Enhancement, % of Control | | | | Bending Stiffness % of Control |
|---|---|---|---|---|---|---|---|---|---|
| | | | | | Kymene 557H Percent | Dry Tensile | Elongation | TEA | |
| 1 | None | — | None | — | 1.0 | 10.8 | 10.0 | — | 95 |
| 2 | KN9-56CMG | 0.15 | Gendrive 162 | 0.15 | 0.75 | 18.3 | 13.9 | | 108 |
| 3 | None | — | None | — | 1.0 | 11.9 | 22.2 | 20.6 | — |
| 4 | None | — | Gendrive 162 | 0.5 | 0.5 | 19.6 | 25.9 | 34.4 | — |
| 5 | Galaxy 707D | 0.25 | Gendrive 162 | 0.25 | 0.5 | 34.5 | 33.2 | 77.6 | 104 |

COMPARATIVE EXAMPLE 4

Results of the evaluation of strength on handsheets prepared with unbleached kraft containing about 2 percent black liquor are shown in Table 4. The results show that a combination of an anionic and a cationic guar additive is not more effective than the cationic guar additive alone when added at the same total level. The guar additives, Galaxy 707D and Gendrive 162, are the same as used in Example 1.

TABLE 4

| Anionic Additive | Percent | Cationic Additive | Percent | Enhancement, % of Control | | |
|---|---|---|---|---|---|---|
| | | | | Tensile Strength | TEA | Elongation |
| Galaxy 707D | 0.50 | Gendrive 162 | 0.5 | 14.2 | 21.1 | 12.5 |
| None | — | Gendrive 162 | 1.0 | 16.9 | 25.3 | 12.5 |

COMPARATIVE EXAMPLE 5

Results of strength properties evaluation on handsheets prepared with partially unbleached kraft incorporated externally with 0.9% black liquor are presented in Table 5. The results show that a combination of an anionic and a cationic guar, when added to this unbleached kraft-black liquor system, is in fact less effective than the cationic guar alone at the same total addition level. The guar additives are the same as those used in Example 1.

TABLE 5

| Anionic Additive | Percent | Cationic Additive | Percent | Tensile Strength (PSI) | TEA (ft. lb/ft$^2$) | Elongation (%) |
|---|---|---|---|---|---|---|
| Control | — | — | — | 5877 | 5.29 | 2.2 |
| Galaxy 707D | 0.5 | Gendrive 162 | 0.5 | 7644 | 7.58 | 2.6 |
| None | — | Gendrive 162 | 1.0 | 8684 | 10.62 | 3.0 |

EXAMPLE 6

This series of tests examines the strength properties and bending stiffness of paper prepared in a small-scale pilot plant version of a conventional paper machine, located at Kalamazoo, Mich. and referred to herein as the Laboratory Former. The pulps used in the numbered tests were: Nos. 1 and 2, 50/50 NSW/NHW kraft; Nos. 3, 4, 7 and 8, 70/30 long fiber/sawdust; and Nos. 1 and 2, 70/30 virgin fiber/broke. In each case, a combination of an anionic and a cationic additive (guar or acrylamide copolymer) was incorporated in the pulp followed by the same amount of wet strength resin Kymene 557H. The anionic components used were all carboxymethyl guars. Among the cationic additives, Percol 743 is a polyacrylamide copolymer, the rest are guars. These results, recorded after 2 weeks natural curing and presented in Table 6, represent the enhancements of properties over what are obtained with 1 percent Kymene 557H alone. They demonstrate the fact that these combinations of an anionic and a cationic component provide synergistic effects on wet strength as well as dry strength of paper. These effects are significantly greater when one of the components is a conventional wet strength resin, such as Kymene 557H.

TABLE 6

| No | Anionic Additive | % | Cationic Additive | % | Kymene 557H % | Total Additive Level % | Enhancement over Control Containing 1% Kymene 557H | | | | Bending Stiffness % of 1% Kymene Control |
|---|---|---|---|---|---|---|---|---|---|---|---|
| | | | | | | | Dry Tensile | Elongation | TEA | Wet Tensile | |
| 1 | WG-18 | 0.30 | Percol 743 | 0.20 | 0.50 | 1.00 | 20.3 | 19.5 | 42.5 | 17.8 | 99 |
| 2 | Galaxy 707D | 0.30 | Gendrive 162 | 0.20 | 0.50 | 1.00 | 18.0 | 24.2 | 45.3 | 10.7 | 96 |
| 3 | 0087-08-2 | 0.30 | Gendrive 162 | 0.20 | 0.50 | 1.00 | 26.2 | 28.2 | 62.2 | 31.9 | 109 |
| 4 | 0087-08-2 | 0.30 | Percol 743 | 0.20 | 0.50 | 1.00 | 26.3 | 32.2 | 63.1 | 40.5 | 99 |
| 5 | 0087-08-2 | 0.30 | Percol 743 | 0.20 | 0.50 | 1.00 | 20.5 | 26.8 | 57.1 | 17.5 | 99 |
| 6 | WG-18 | 0.30 | 0083-40-3 | 0.20 | 0.50 | 1.00 | 15.4 | 18.5 | 36.8 | 11.3 | 107 |
| 7 | D-3129 | 0.30 | Percol 743 | 0.20 | 0.50 | 1.00 | 25.0 | 22.0 | 52.0 | 36.8 | 104 |
| 8 | WG-18 | 0.30 | 0083-40-3 | 0.20 | 0.50 | 1.00 | 19.3 | 27.3 | 62.0 | 29.2 | 98 |

EXAMPLE 7

This series of tests examines the strength properties and bending stiffness on handsheets prepared in the Laboratory Former. The pulps used in the numbered tests were: Nos. 1 to 6, 55/30/15 northern softwood/CTMP/recycled pulp, and No. 7, 50/50 northern softwood/hardwood furnish. The results in No. 8 were produced from handsheets using 70/30 northern softwood/CTMP pulp. All the cationic additives were modified polyacrylamides. Percol 743 is a copolymer of acrylamide and 10 mole % MTMAC (Methylacryloxytrimethyl ammonium chloride), Reten 157 contains 10 mole % ATMAC (acryloxytrimethyl ammonium chloride) and Hercofloc 1154 contains 6 mole % DADMAC (dialcryloxydimethyl ammonium chloride). All the anionic additives are guar products available from Aqualon. The results are recorded in Table 7.

TABLE 7

| | POLYACRYLAMIDE COPOLYMER - GUAR COMBINATIONS | | | | | | | |
|---|---|---|---|---|---|---|---|---|
| No | Anionic Additive | Percent | Cationic Additive | Percent | Enhancement, % of Control | | | Bending Stiffness % of Control |
| | | | | | Tensile Strength | Elongation | TEA | |
| 1 | None | — | Percol 743 | 1.00 | 6.4 | 15.0 | 22.6 | — |
| 2 | K0341 A2 WG-18) | 0.50 | Percol 743 | 0.50 | 17.8 | 12.9 | 36.3 | — |
| 3 | None | — | Reten 157 | 1.0 | 5.3 | 11.7 | 14.6 | — |
| 4 | AQU-D3129 | 0.50 | Reten 157 | 0.5 | 12.7 | 19.5 | 35.3 | — |
| 5 | None | — | Hercofloc 1154 | 1.0 | 11.7 | 10.0 | 21.1 | — |

TABLE 7-continued

POLYACRYLAMIDE COPOLYMER - GUAR COMBINATIONS

| No | Anionic Additive | Percent | Cationic Additive | Percent | Enhancement, % of Control | | | Bending Stiffness % of Control |
|---|---|---|---|---|---|---|---|---|
| | | | | | Tensile Strength | Elongation | TEA | |
| 6 | AQU-D3129 | 0.50 | Hercofloc 1154 | 0.50 | 16.9 | 22.8 | 44.2 | — |
| 7 | AQU-D3129 | 0.50 | Percol 743 | 0.50 | 37.5 | 45.5 | 101 | 106 |
| 8 | Galaxy 707D | 0.50 | Hercofloc 1154 | 0.50 | 16.3 | 8.0 | 26.4 | 92 |

EXAMPLE 8

This series of tests examines the strength properties and bending stiffness of paper prepared in the Kalamazoo Laboratory Former with 70/30 northern softwood/CTMP furnish. The anionic component was added first followed by the cationic component, and the wet strength resin (Kymene 557H) was added last. The results, recorded in Table 8, show that the combination of a wet strength resin and an anionic and a cationic guar, and even the combination of a an anionic guar and a wet strength resin enhances not only the dry strength but also the wet strength very significantly over the corresponding properties obtained by the same amount of the wet strength resin alone. The bending stiffness of the paper samples is not adversely affected by the presence of these additive combinations. The additives AQU-D3129, Galaxy 707D and 0.1 DSCMG are anionic carboxymethyl guars. 404-48-3, 404-48-1 and Gendrive 162 are Aqualon cationic guars of which the first two are developmental. The respective controls used were made with the same furnish, but with no additive.

kraft (SWK/HWK); (Nos. 5 and 6), 70/30 northern softwood kraft/CTMP (NSK/CTMP). AQU-D3129 and Galaxy 707D are anionic carboxymethyl guars previously referred to, and Gendrive 162 is a cationic guar previously referred to, while 404-48-3 is a developmental cationic guar. The results, which are recorded in Table 9, show that the paper properties obtained by adding to the pulp coacervates formed by premixing the anionic and cationic components are about the same as those obtained by adding the additives individually to the pulp. They were significantly more convenient to use.

TABLE 9

| No | Anionic Additive | % | Cationic Additive | % | Modes of Addition to Pulp System | Enhancement over Control Containing 1% Kymene 557H | | | Bending Stiffness % of Control |
|---|---|---|---|---|---|---|---|---|---|
| | | | | | | Tensile Strength | Elongation | TEA | |
| 1 | AQU-D3129 | 0.5 | 404-48-3 | 0.5 | Added individually in pulp | 12.2 | 12.5 | 11.6 | 102 |
| 2 | AQU-D3129 | 0.5 | 404-48-3 | 0.5 | Premixed to form coacervate before adding to pulp | 12.8 | 8.3 | 21.7 | 107 |
| 3 | AQU-D3129 | 1.0 | 404-48-3 | 1.0 | Added individually | 28.5 | 25.0 | 45.0 | 108 |
| 4 | AQU-D3129 | 1.0 | 404-48-3 | 1.0 | Premixed to form coacervate | 25.6 | 29.2 | 49.8 | 110 |
| 5 | Galaxy 707D | 0.5 | Gendrive 162 | 0.5 | Added individually to pulp | 17.8 | 6.5 | 28.5 | 91 |
| 6 | Galaxy 707D | 0.5 | Gendrive 162 | 0.5 | Premixed to form coacervate before adding to pulp | 17.4 | 9.7 | 29.3 | 95 |

EXAMPLE 10

Dry strength properties and bending stiffness of paper prepared in the Kalamazoo Laboratory Former (KLF) with 55/30/15 NSK/CTMP/secondary furnish are presented in Table 10. The data recorded in K-17803 and K-17822 represent enhancement of dry strength properties over what was obtained with the control with no additive. The anionic additive employed are CMG (AQU-D3129, Galaxy 707D) and CMHPG (WG-18) while the cationic components are cationic guars

TABLE 8

| No | Anionic Additive | % | Cationic Additive | % | Kymene 557H % | Total Additive Level % | Enhancement, % of Control | | | | Bending Stiffness % of Control |
|---|---|---|---|---|---|---|---|---|---|---|---|
| | | | | | | | Dry Tensile | Elongation | TEA | Wet Tensile (P/I) | |
| 1 | None | — | None | — | 1.00 | 1.00 | 9.1 | 3.4 | 13.0 | 5.65 | 113 |
| 2 | None | — | None | — | 1.50 | 1.50 | — | 9.9 | 15.5 | 5.85 | 130 |
| 3 | None | — | None | — | 2.00 | 2.00 | 11.9 | 13.0 | 37.0 | 5.93 | — |
| 4 | AQU-D3129 | 0.13 | 404-48-3 | 0.13 | 1.00 | 1.26 | 17.5 | 24.0 | 52.3 | 6.44 | 88 |
| 5 | Galaxy 707D | 0.25 | 404-48-1 | 0.25 | 1.00 | 1.50 | 16.3 | 20.0 | 37.0 | 6.58 | 91 |
| 6 | 0.1 DSCMG | 0.19 | 404-48-1 | 0.19 | 1.50 | 1.88 | 28.2 | 4.3 | 29.8 | 7.14 | — |
| 7 | 0.1 DSCMG | 0.50 | Gendrive 162 | 0.50 | 1.00 | 2.00 | 33.4 | 8.9 | 38.9 | 7.15 | 89 |
| 8 | 0.1 DSCMG | 1.00 | None | — | 1.00 | 2.00 | 32.6 | 9.8 | 30.9 | 7.67 | — |

EXAMPLE 9

This series of tests examines the strength properties and bending stiffness of handsheets prepared from the following pulps: Nos. 1 to 4, 50/50 softwood/hardwood (Jaguar CP-13-HiTek, and 0083-40-3) and acrylamide copolymer (Percol 743). The results show that in most cases, at the same level of addition, dry strength with a combination of an anionic and a cationic guar (or a cationic polyacrylamide) is significantly higher than what is obtained with a combination of an anionic guar and the wet strength resin Kymene 557H, with less adverse effect of paper softness, as indicated by the bending stiffness results.

CMHPG, while CMC-6CTL is a technical grade carboxymethyl cellulose such as that disclosed in the Patent. Gendrive 162 is a cationic guar and Reten ® 157 is an acrylamide copolymer. A sharp drop in dry strength accompanied by an increase in bending stiffness was noted whe the carboxymethyl cellulose was used.

TABLE 10

| Anionic Additive | Percent | Cationic Additive | Percent | Kymene 557H Percent | Total Additive Level % | Enhancement, % of Control | | | Bending Stiffness % of Control |
|---|---|---|---|---|---|---|---|---|---|
| | | | | | | Tensile | TEA | Elongation | |
| AQU-D3129 | 0.50 | Jaguar CP-13 | 0.50 | None | 1.00 | 43.3 | 76.9 | 29.0 | 87 |
| WG-18 | 0.50 | Percol 743 | 0.50 | None | 1.00 | 32.9 | 63.2 | 27.8 | 89 |
| WG-18 | 0.50 | 0083-40-3 | 0.50 | None | 1.00 | 26.9 | 47.0 | 19.5 | 108 |
| AQU-D3129 | 0.50 | None | — | 0.50 | 1.00 | 23.5 | 54.2 | 23.9 | 112 |
| WG-18 | 0.50 | None | — | 0.50 | 1.00 | 9.3 | 28.0 | 18.0 | 110 |
| Galaxy 707D | 0.50 | None | — | 0.50 | 1.00 | 25.7 | 57.0 | 23.9 | 118 |

TABLE 12

| Run No. | Anionic Additive | Percent | Cationic Additive | Percent | Kymene 557H Percent | Enhancement, % of Control | | | Wet Strength Enhancement % 0.5 Kymene | Bending Stiffness % of Control |
|---|---|---|---|---|---|---|---|---|---|---|
| | | | | | | Tensile | TEA | Elongation | | |
| 1 | Galaxy 707D | 0.30 | Gendrive 162 | 0.20 | 0.50 | 31.0 | 102 | 33.6 | 24.5 | — |
| 2 | Galaxy 707D | 0.50 | None | — | 0.50 | 27.6 | 68 | 30.6 | 27.0 | — |
| 3 | WG-18 | 0.20 | Reten 157 | 0.30 | 0.50 | 30.8 | 76 | — | — | 96 |
| 4 | WG-18 | 0.50 | None | — | 0.50 | 22.4 | 60 | 37.3 | 25.7 | 94 |
| 5* | CMC-6CTL | 0.50 | None | — | 0.50 | 13.5 | 21 | 13.1 | 12.0 | 99 |

*See U.S. Pat. No. 3,058,873 described above.

EXAMPLE 11

Dry strength properties and bending stiffness of paper prepared in the KLF using 70/30 NSK/CTMP furnish are recorded in Table 11. The data demonstrated enhancement of dry strength properties over what was obtained with the control containing no additive. The anionic additives are CMG and cationic components are either cationic guar or Kymene 557H, a wet strength resin. The results show that in most cases, at the same level of addition, a combination of an anionic and a cationic guar provides significantly higher dry strength than what is obtained with the combination of an anionic guar and Kymene, with less adverse effect on paper softness.

TESTS OF ADDITIVES FOR EXAMPLES

Results of viscosity and relative specific viscosity (RSV) for 0.25% aqueous solutions of the guar additives are shown in Table 13. The results indicate the range of relative molecular weights of typical additives employed in the examples. Since these data do not lead to the absolute molecular weights of the additives, no comparison can be made with similar data for materials of different molecular shapes. Charge densities of typical additives employed in the examples are shown in Table 14.

TABLE 11

| Anionic Additive | Percent | Cationic Additive | Percent | Kymene 557H Percent | Total Additive Level % | Enhancement, % of Control | | | Bending Stiffness % of Control |
|---|---|---|---|---|---|---|---|---|---|
| | | | | | | Tensile | TEA | Elongation | |
| AQU-D3129 | 0.50 | 404-48-1 | 0.50 | None | 1.00 | 34.8 | 53.7 | 25.7 | 95 |
| AQU-D3129 | 0.60 | 404-48-3 | 0.40 | None | 1.00 | 25.6 | 45.9 | 21.0 | 92 |
| AQU-D3129 | 0.50 | 404-48-3 | 0.50 | None | 1.00 | 25.9 | 96.6 | 51.2 | 96 |
| AQU-D3129 | 0.50 | None | — | 0.50 | 1.00 | 18.4 | 26.7 | 9.8 | 110 |
| Galaxy 707D | 0.50 | None | — | 1.0 | 1.50 | 26.5 | 51.5 | 22.8 | 116 |
| 0.1 DS CMG | 1.0 | None | — | 1.0 | 2.00 | 22.5 | 30.9 | 9.2 | — |

COMPARATIVE EXAMPLE 12

Strength properties and bending stiffness of paper prepared at the Kalamazoo Laboratory Former with 70/30 NSW/CTMP are presented in Table 12. The results demonstrate enhancement of dry strength properties over what was obtained with the control with no additive while the wet strength tensile is the enhancement over what was obtained with 0.5% Kymene ® alone. To demonstrate the advantages achieved by the combinations of anionic and cationic components according to the invention over the prior art combinations described in U.S. Pat. No. 3,058,873, the anionic additives used according to the invention were CMG and

TABLE 13

| Additives | Viscosity (CP) | RSV (dl/g) |
|---|---|---|
| Guar Gendrive 162 | 31.1 | 121.5 |
| Guar Galaxy 707D | 9.0 | 32.4 |
| Guar Jaguar CP-13 | 66.5 | 223.8 |

TABLE 14

| Product | Charge Density (meq/g) | Viscosity (cp) 2% Solution |
|---|---|---|
| AQU-D3129 | −1.34 | 2,300 |
| 404-48-3 | 0.86 | 4,200 |
| Jaguar 8707 | −0.012 | 12,000 |

TABLE 14-continued

| Product | Charge Density (meq/g) | Viscosity (cp) 2% Solution |
|---|---|---|
| Jaguar LP-13 | 0.23 | 23,000 |

I claim:

1. A process for making paper to enhance the dry strength of the paper produced without substantially reducing its softness, comprising adding, separately or together, to the pulp stock in the wet end of a paper machine that consists essentially of a bleached pulp furnish, the following additives essentially consisting of (1) an anionic polymeric component selected from the group of polymers consisting of carboxymethyl guar, carboxymethyl bean gum, carboxymethyl hydroxyethyl guar, and a carboxymethyl hydroxypropyl guar, and (2) a cationic polymer selected from the group consisting of a cationic guar, a cationic acrylamide copolymer, a cationic bean gum, a cationic wet strength resin, and both a cationic wet strength resin and at least one of the other of said cationic polymers, the cationic wet strength resin being a polymeric amine-epichlorohydrin resin selected from the group consisting of a polyamide-epichlorohydrin (PAE) resin, a polyalkylenepolyamine-epichlorohydrin (PAPAE) resin, and an amine polymer-epichlorohydrin (APE) resin, in which amine polymer-epichlorohydrin resin amine groups have been alkylated with epichlorohydrin to produce a polyamine-epichlorohydrin resin that has azetidinium or epoxide functionality, the anionic component and the cationic component being added to the pulp furnish, in a total amount of 0.1 to 5 percent based on the dry weight of the pulp, and the ratio of the anionic component to the cationic component being from 1/20 to 10/1.

2. A process for making paper as claimed in claim 1, in which the anionic component is an anionic guar.

3. A process for making paper as claimed in claim 1, in which the cationic component is a cationic guar.

4. A process for making paper as claimed in claim 1, in which the cationic component is a cationic acrylamide copolymer.

5. A process for making paper as claimed in claim 1, in which the cationic component is a wet strength resin.

6. A process for making paper as claimed in claim 1, in which the cationic component contains both a cationic guar and a wet strength resin.

7. A process for making paper as claimed in claim 1, in which the cationic component contains both a cationic acrylamide copolymer and a wet strength resin.

8. A process for making paper as claimed in claim 1, in which the cationic component contains both a cationic bean gum and a wet strength resin.

9. A process for making paper as claimed in claim 1, in which the wet strength resin is produced by reacting a saturated aliphatic dicarboxylic acid containing three to ten carbon atoms with a polyalkylenepolyamine, containing from two to four ethylene groups, two primary amine groups, and one to three secondary amine groups to form a poly(aminoamide) having secondary amine groups that are alkylated with epichlorohydrin to form a PAE resin.

10. A process for making paper as claimed in claim 9, in which the polyalkylenepolyamine is selected from the group consisting of diethylenetriamine, triethylenetetramine and tetraethylenepentamine.

11. A process for making paper as claimed in claim 9, in which the polyalkylenepolyamine is diethylenetriamine.

12. A process for making paper as claimed in claim 11, in which the dicarboxylic acid is adipic acid.

13. A process for making paper as claimed in claim 1, in which the polyalkylenepolyamine is a polyethylenepolyamine in which adipic acid is reacted with diethylenetriamine to form a poly(aminoamide) that is alkylated and crosslinked with epichlorohydrin to form a PAE resin.

14. A process for making paper as claimed in claim 2, in which the anionic guar is obtained by reacting a natural guar with caustic and subsequently with monochloroacetate.

15. A process for making paper as claimed in claim 3, in which the cationic guar is obtained by reacting a natural guar with caustic and subsequently with quaternary ammonium chloride.

16. A process for making paper as claimed in claim 1, in which the anionic and cationic components are anionic and cationic guars and are added in a total amount of 0.1 to 2%.

17. A process for making paper as claimed in claim 1, in which the anionic component is an anionic guar.

18. A process for making paper as claimed in claim 1, in which the cationic component is a cationic guar.

19. A process for making paper as claimed in claim 1, in which the cationic component is a cationic wet strength resin.

20. A process for making paper as claimed in claim 1, in which the ratio of the anionic guar to the cationic guar is from 1/10 to 2/1.

21. A process for making paper as claimed in claim 20, in which the ratio of the anionic guar to the cationic guar is in the range of 5/1 to 1/5.

22. A process for making paper as claimed in claim 21, in which the ratio of the anionic guar to the cationic guar is about 1/1.

23. A process for making paper as claimed in claim 1, in which an anionic guar and a cationic guar are mixed together and the mixture is added together with a wet strength resin.

24. A process for making paper as claimed in claim 1, in which the anionic guar and the cationic guar are added together and the wet strength resin is added later.

* * * * *

UNITED STATES PATENT AND TRADEMARK OFFICE
CERTIFICATE OF CORRECTION

PATENT NO. : 5,318,669

DATED : June 7, 1994

INVENTOR(S) : Sunil P. Dasgupta

It is certified that error appears in the above-identified patent and that said Letters Patent is hereby corrected as shown below:

Col. 1, line 8, instead of "abandoned." should read
--U.S. Patent No. 5,338,407 issued August 16, 1994.--

Signed and Sealed this

Twelfth Day of September, 1995

Attest:

BRUCE LEHMAN

*Attesting Officer*  *Commissioner of Patents and Trademarks*